(12) United States Patent
Kowalchuk

(10) Patent No.: US 11,432,454 B2
(45) Date of Patent: *Sep. 6, 2022

(54) SYSTEM AND METHOD FOR SPRAYING FLUID ONTO SEEDS DISPENSED FROM A PLANTER

(71) Applicant: CNH Industrial Canada, Ltd., Saskatoon (CA)

(72) Inventor: Trevor L. Kowalchuk, Saskatchewan (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 155 days.

This patent is subject to a terminal disclaimer.

(21) Appl. No.: 16/780,434

(22) Filed: Feb. 3, 2020

(65) Prior Publication Data

US 2020/0170176 A1 Jun. 4, 2020

Related U.S. Application Data

(62) Division of application No. 15/683,943, filed on Aug. 23, 2017, now Pat. No. 10,582,655.

(51) Int. Cl.
*A01C 1/06* (2006.01)
*A01C 7/20* (2006.01)
(Continued)

(52) U.S. Cl.
CPC ............... *A01C 1/06* (2013.01); *A01C 7/06* (2013.01); *A01C 7/127* (2013.01); *A01C 7/20* (2013.01);
(Continued)

(58) Field of Classification Search
CPC .. A01C 1/06; A01C 7/06; A01C 7/127; A01C 7/206; A01C 21/007; A01C 5/064;
(Continued)

(56) References Cited

U.S. PATENT DOCUMENTS 4,023,509 A * 5/1977 Hanson .................. A01C 7/20
    111/172
4,193,523 A * 3/1980 Koning .................. A01C 9/08
    222/254
(Continued)

FOREIGN PATENT DOCUMENTS

DE      10349321      5/2005
EP      3189719 A1    7/2017
(Continued)

OTHER PUBLICATIONS

Lin Chen, "Design and Evaluation of a Levelling System for a Weeding Robot," IFAC-PapersOnLine, vol. 49, Issue 16, 2016, pp. 299-304, https://www.sciencedirect.com/science/article/pii/S2405896316316184.

(Continued)

*Primary Examiner* — Chee-Chong Lee
(74) *Attorney, Agent, or Firm* — Rebecca L. Henkel; Rickard K. DeMille

(57) ABSTRACT

In one aspect, a system for spraying a fluid onto or near seeds may include a planter having a seed meter configured to dispense seeds from a hopper, a seed tube extending from the seed meter toward a furrow, and a rotationally-driven belt positioned within the seed tube. The belt may be configured for conveying the seeds from the seed meter through the seed tube to the furrow. The planter also includes a sprayer assembly having a nozzle configured to spray a fluid on or near the seeds dispensed from the seed meter. The system may further include a controller configured to determine a current speed of the belt relative to the seed tube and control the sprayer assembly based on the current speed of the belt such that the nozzle sprays the fluid at least one of onto or near each of the seeds.

19 Claims, 8 Drawing Sheets

(51) Int. Cl.

| | |
|---|---|
| *A01C 7/06* | (2006.01) |
| *A01C 7/12* | (2006.01) |
| *A01C 21/00* | (2006.01) |
| *B05B 9/01* | (2006.01) |
| *B05B 12/06* | (2006.01) |
| *B05B 12/12* | (2006.01) |
| *A01C 5/06* | (2006.01) |
| *A01C 7/04* | (2006.01) |
| *A01C 7/08* | (2006.01) |
| *A01C 15/00* | (2006.01) |
| *B05B 13/00* | (2006.01) |

(52) U.S. Cl.
CPC ............ *A01C 7/206* (2013.01); *A01C 21/007* (2013.01); *B05B 9/01* (2013.01); *B05B 12/06* (2013.01); *A01C 5/064* (2013.01); *A01C 5/068* (2013.01); *A01C 7/046* (2013.01); *A01C 7/081* (2013.01); *A01C 15/006* (2013.01); *B05B 12/122* (2013.01); *B05B 13/005* (2013.01)

(58) Field of Classification Search
CPC ......... A01C 5/068; A01C 7/046; A01C 7/081; A01C 15/006; B05B 9/01; B05B 12/06; B05B 13/005
USPC ............................................................ 239/1
See application file for complete search history.

(56) References Cited

U.S. PATENT DOCUMENTS

| | | | |
|---|---|---|---|
| 4,224,882 A | 9/1980 | Cruse | |
| 4,555,624 A * | 11/1985 | Steffen | A01C 7/105 111/903 |
| 4,600,122 A * | 7/1986 | Lundie | A01C 7/046 221/211 |
| 4,635,215 A * | 1/1987 | Friend | G06M 1/101 702/128 |
| 5,533,458 A * | 7/1996 | Bergland | A01C 7/105 111/200 |
| 5,956,255 A | 9/1999 | Flamme | |
| 6,237,514 B1 | 5/2001 | Romans | |
| 6,516,733 B1 | 2/2003 | Sauder et al. | |
| 7,421,960 B2 | 9/2008 | Ahm et al. | |
| 7,490,565 B2 | 2/2009 | Holly | |
| 7,555,990 B2 | 7/2009 | Beaujot | |
| 8,418,636 B2 | 4/2013 | Liu et al. | |
| 8,468,960 B2 * | 6/2013 | Garner | A01C 7/046 111/171 |
| 8,651,033 B2 | 2/2014 | Wollenhaupt et al. | |
| 8,738,244 B2 | 5/2014 | Lenz et al. | |
| 8,843,269 B2 | 9/2014 | Anderson et al. | |
| 8,857,530 B2 | 10/2014 | Henry | |
| 9,026,321 B2 | 5/2015 | Henry et al. | |
| 9,144,188 B2 | 9/2015 | Bover Trobat | |
| 9,226,442 B2 | 1/2016 | Grimm et al. | |
| 9,282,688 B2 | 3/2016 | Casper et al. | |
| 9,345,189 B2 | 5/2016 | Harmelink et al. | |
| 9,516,802 B2 | 12/2016 | Zemenchik | |
| 9,578,802 B2 | 2/2017 | Radtke et al. | |
| 9,633,491 B2 | 4/2017 | Wonderlich | |
| 9,635,804 B2 | 5/2017 | Carr et al. | |
| 10,123,475 B2 | 11/2018 | Posselius et al. | |
| 10,262,206 B2 | 4/2019 | Posselius | |
| 2012/0265410 A1 | 10/2012 | Graham et al. | |
| 2013/0269578 A1 * | 10/2013 | Grimm | A01C 23/007 111/127 |
| 2015/0359164 A1 | 12/2015 | Bardi | |
| 2016/0374260 A1 | 12/2016 | Kowalchuk | |
| 2017/0112043 A1 | 4/2017 | Nair et al. | |
| 2018/0206393 A1 | 7/2018 | Stoller et al. | |
| 2018/0310474 A1 | 11/2018 | Posselius et al. | |

FOREIGN PATENT DOCUMENTS

| | | |
|---|---|---|
| WO | WO2016182906 | 11/2016 |
| WO | WO2016209217 | 12/2016 |

OTHER PUBLICATIONS

Manuel Vázquez-Arellano, "3-D Imaging Systems for Agricultural Applications," Sensors 16(5):618, Apr. 2016 (36 pages) https://www.researchgate.net/publication/301790612_3-D_Imaging_Systems_for_Agricultural_Applications-A_Review.

Zhiang Zheng, "Design of Measuring Method and Instrument for Agricultural Soil Surface Roughness," American Society of Agricultural and Biological Engineers, Dated Apr. 17, 2019 (1 page) https://elibrary.asabe.org/abstract.asp?aid=48363&t=3&redir=&redirType=.

Operator's Manual, True-Tandem™ 335 VT, (42-47 Foot) Vertical Tillage, Part No. 47934942, $2^{nd}$ Edition English Aug. 2016, Replaces Part No. 47789750, Case IH Agriculture (144 Pages).

* cited by examiner

_US 11,432,454 B2_

SYSTEM AND METHOD FOR SPRAYING FLUID ONTO SEEDS DISPENSED FROM A PLANTER

FIELD

The present disclosure generally relates to row-crop planters or seeders and, more particularly, to systems and methods for spraying fluids onto and/or near seeds dispensed from a seed meter of a planter.

BACKGROUND

Modern farming practices strive to increase yields of agricultural fields. For example, seeds may be coated with various fluids, such as fungicides, herbicides, and/or fertilizers, which improve the performance of the seeds based on the particular agronomic characteristics of the field. As such, farmers typically order seeds that are pre-coated with the desired fluid well in advance of planting season to ensure availability and/or reasonable prices. However, the agronomic characteristics of the field may change as the planting season nears due to unforeseen weather conditions, pests, and/or the like. In this respect, the particular fluid coating selected for the seeds may be at least partially based on speculation. Furthermore, coated seeds may be harmful to livestock and wildlife, thereby complicating handling and storage thereof.

In this regard, systems and methods for spraying or otherwise coating the seeds during planting operations have been developed. Since seeds are generally spaced apart when planted, it is desirable to only spray the seeds or the area immediately surrounding the seeds so as not to waste the fluid by spraying the ground between the seeds. For example, planters generally include a seed meter, which dispenses the seeds at a specific rate to achieve the desired spacing of the seeds within a furrow. As such, conventional systems and methods spray the seeds based on the speed at which the seed meter is operating. However, the seeds may bounce within a seed tube extending from the seed meter toward the furrow such that the seeds may land in the furrow at a slightly different frequency than dispensed by the seed meter.

Accordingly, an improved system and method for spraying fluid onto or near seeds dispensed from a seed meter of a planter would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for spraying a fluid onto or near seeds dispensed from a seed meter of a planter. The system may include a planter having a seed meter configured to dispense seeds from a hopper, a seed tube extending from the seed meter toward a furrow, and a rotationally-driven belt positioned within the seed tube. The belt may be configured for conveying the seeds from the seed meter through the seed tube to the furrow. The planter may also include a sprayer assembly having a nozzle configured to spray a fluid on or near the seeds dispensed from the seed meter. The system may further include a controller communicatively coupled to the sprayer assembly. The controller may be configured to determine a current speed of the belt relative to the seed tube and control the sprayer assembly based on the current speed of the belt such that the nozzle sprays the fluid at least one of onto or near each of the seeds.

In another aspect, the present subject matter is directed to a method for spraying a fluid onto or near seeds dispensed from a seed meter of a planter. The method may include controlling, with a computing device, an operation of a seed meter of the planter such that seeds are dispensed into a seed tube of the planter. The seed tube may include a rotationally-driven belt positioned therein. The method may further include determining, with the computing device, a current speed of the belt relative to the seed tube as seeds are being conveyed through the seed tube via the belt and dispensed from the seed tube into a furrow. Additionally, the method may include controlling, with the computing device, an operation of a sprayer assembly of the planter based on the current speed of the belt such that a nozzle of the sprayer assembly sprays fluid at least one of onto or near each of the seeds.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
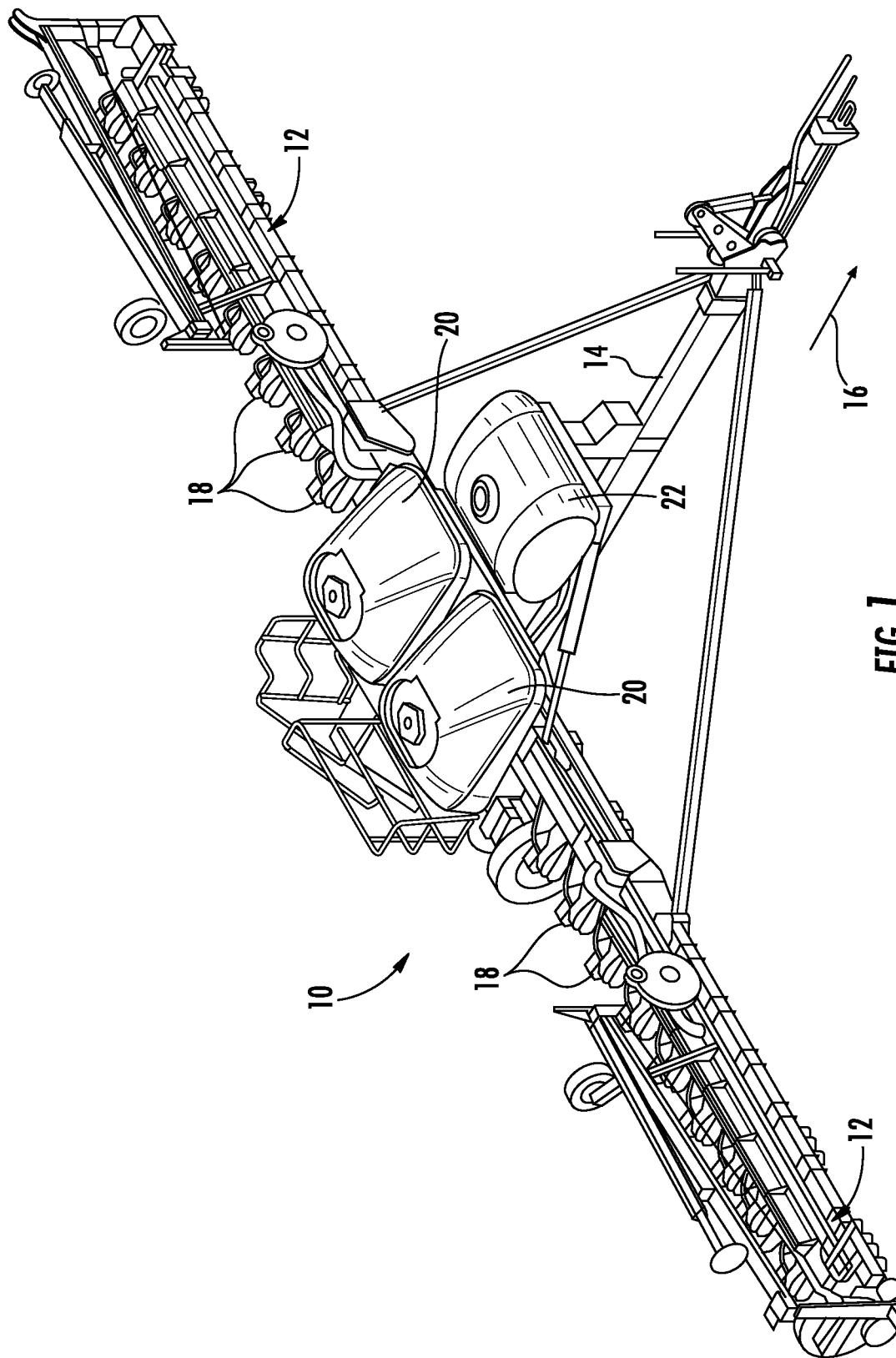
FIG. 1 illustrates a perspective view of one embodiment of a planter in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for spraying fluids onto or near seeds dispensed from a seed meter of a planter. Specifically, in several embodiments, the planter may include a seed meter configured to dispense seeds from a hopper, a seed tube extending from the seed meter toward a furrow, and a rotationally-driven belt positioned within the seed tube. As such, the belt may be configured for conveying the seeds dispensed by the seed meter through the seed tube to the furrow, thereby preventing the seeds from bouncing around within the seed tube. The planter may further include a sprayer assembly having a nozzle configured to spray a fluid on or near the seeds dispensed from the seed meter. For example, the nozzle may be configured to spray the fluid onto the seeds while the belt is conveying the seeds through the seed tube or after the seeds have been deposited within the furrow. Additionally, a controller communicatively coupled to the sprayer assembly may be configured to determine a current speed of the belt relative to the seed tube. In this regard, the speed of the belt may be indicative of the frequency at which the seeds pass by the nozzle of the sprayer assembly. Accordingly, the controller may be configured to control the sprayer assembly based on the current speed of the belt such that the nozzle sprays the fluid onto or near each of the seeds.

Referring now to drawings, FIG. 1 illustrates a perspective view of one embodiment of a planting implement or planter 10 in accordance with aspects of the present subject matter. As shown in FIG. 1, the planter 10 may include a laterally extending toolbar or frame assembly 12 connected at its middle to a forwardly extending tow bar 14 to allow the planter 10 to be towed by a work vehicle (not shown), such as an agricultural tractor, in a direction of travel (e.g., as indicated by arrow 16). The frame assembly 12 may generally be configured to support a plurality of seed planting units (or row units) 18. As is generally understood, each row unit 18 may be configured to deposit seeds at a desired depth beneath the soil surface and at a desired seed spacing as the planter 10 is being towed by the work vehicle, thereby establishing rows of planted seeds. In some embodiments, the bulk of the seeds to be planted may be stored in one or more hoppers or seed tanks 20. Thus, as seeds are planted by the row units 18, a pneumatic distribution system may distribute additional seeds from the seed tanks 20 to the individual row units 18. Additionally, one or more fluid tanks 22 may store agricultural fluids, such as insecticides, herbicides, fungicides, fertilizers, and/or the like. As will be described below, the fluids may be supplied to the individual row units 18 for spraying onto the seeds during planting.

It should be appreciated that, for purposes of illustration, only a portion of the row units 18 of the planter 10 have been shown in FIG. 1. In general, the planter 10 may include any number of row units 18, such as 6, 8, 12, 16, 24, 32, or 36 row units. In addition, it should be appreciated that the lateral spacing between row units 18 may be selected based on the type of crop being planted. For example, the row units 18 may be spaced approximately 30 inches from one another for planting corn, and approximately 15 inches from one another for planting soybeans.

It should also be appreciated that the configuration of the planter 10 described above and shown in FIG. 1 is provided only to place the present subject matter in an exemplary field of use. Thus, it should be appreciated that the present subject matter may be readily adaptable to any manner of planter configuration.

Figure 2:
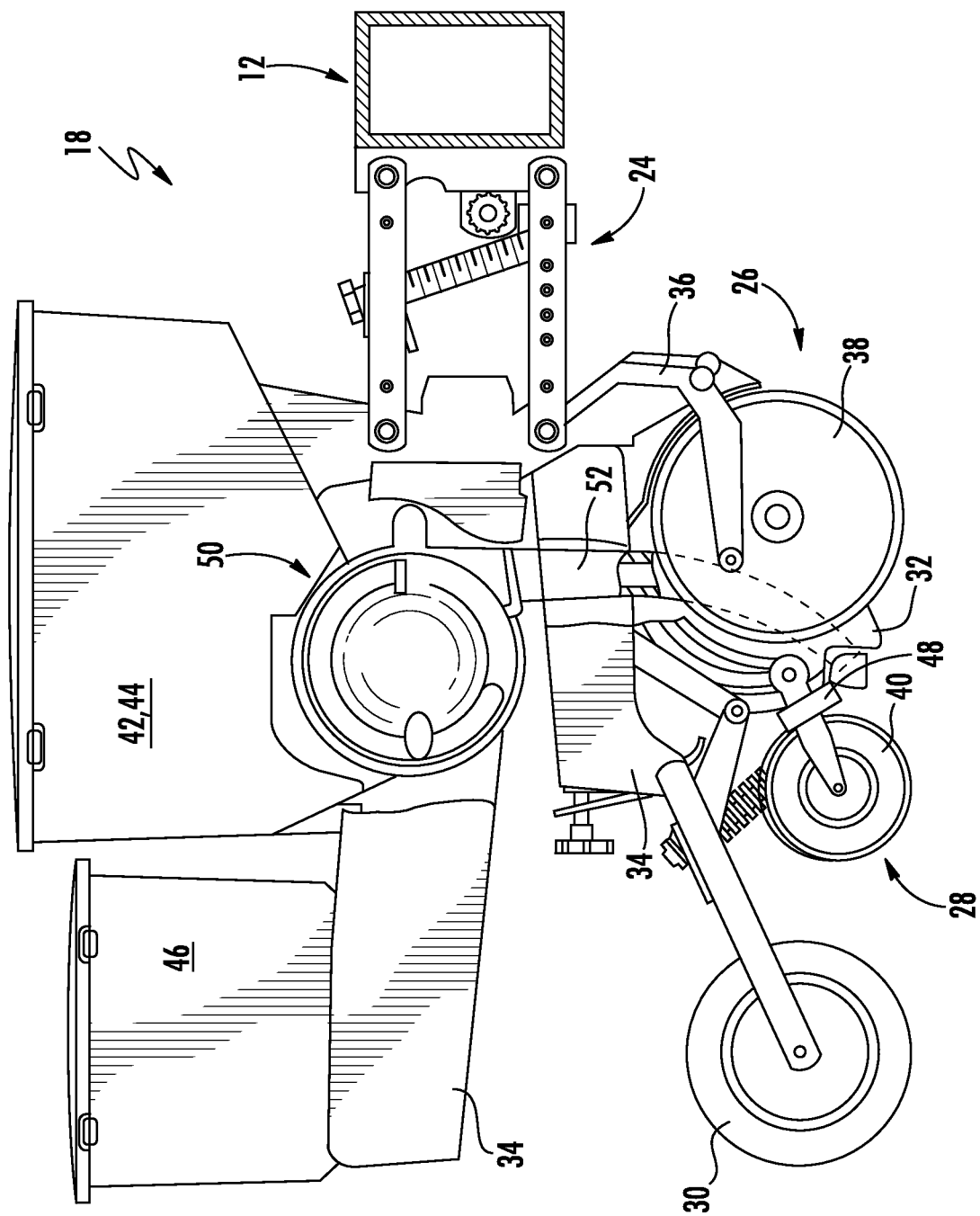
FIG. 2 illustrates a side view of one embodiment of a row unit suitable for use with a planter in accordance with aspects of the present subject matter.

Referring now to FIG. 2, a side view of one embodiment of a row unit 18 is illustrated in accordance with aspects of the present subject matter. As shown, the row unit 28 includes a linkage assembly 24 configured to mount the row unit 18 to the toolbar or frame assembly 12 of the planter 10. As shown in FIG. 2, the row unit 18 also includes a furrow opening assembly 26, a furrow closing assembly 28, and a press wheel 30. In general, the furrow opening assembly 26 may include a gauge wheel (not shown) operatively connected to a frame 34 of the row unit 18 via a support arm 36. Additionally, the opening assembly 26 may also include one or more opening disks 38 configured to excavate a furrow or trench in the soil and a firming point 32. The gauge wheel is not shown to better illustrate the opening disk 38. As is generally understood, the gauge wheel may be configured to engage the surface of the field, with the height of the opening disk(s) 38 being adjusted with respect to the position of the gauge wheel to set the desired depth of the furrow being excavated. Moreover, as shown, the furrow closing assembly 28 may include a closing disk(s) 40 configured to close the furrow after seeds have been deposited into the furrow. The press wheel 30 may then be configured to roll over the closed furrow to firm the soil over the seed and promote favorable seed-to-soil contact.

Additionally, as shown in FIG. 2, the row unit 18 may include one or more seed hoppers 42, 44 and a fluid tank 46 supported on the frame 34. In general, the seed hopper(s) 42, 44 may be configured to store seeds received from the seed tanks 20, which are to be deposited within the furrow as the row unit 18 moves over and across the field. For instance, in several embodiments, the row unit 18 may include a first seed hopper 42 configured to store seeds of a first seed type and a second hopper 44 configured to store seeds of a second seed type. However, both seed hoppers 42, 44 may be configured to store the same type of seeds. Furthermore, the fluid tank 46 may be configured to store fluid received from the fluid tank 22 (FIG. 1), which is to be sprayed onto the seeds dispensed from the seed hoppers 42, 44. For example, as will be described below, a sprayer assembly 48 of the row unit 18 may be configured to spray the fluid onto the seeds.

Moreover, in accordance with aspects of the present subject matter, the row unit 18 may include a seed meter 50 provided in operative association with the seed hopper(s) 42, 44. In general, the seed meter 50 may be configured to uniformly release seeds received from the seed hopper(s) 42, 44 for deposit within the furrow. For instance, in one embodiment, the seed meter 50 may be coupled to a suitable vacuum source (e.g., a blower powered by a motor and associated tubing or hoses) configured to generate a vacuum or negative pressure that attaches the seeds to a rotating seed disk of the seed meter 50, which controls the rate at which the seeds are output from the seed meter 50 to an associated seed tube 52. As shown in FIG. 2, the seed tube 52 may extend vertically from the seed meter 50 toward the ground to facilitate delivery of the seeds output from the seed meter 50 to the furrow.

It should be appreciated that the configuration of the row unit 18 described above and shown in FIG. 2 is provided only to place the present subject matter in an exemplary field of use. Thus, it should be appreciated that the present subject matter may be readily adaptable to any manner of seed planting unit configuration.

Figure 3:
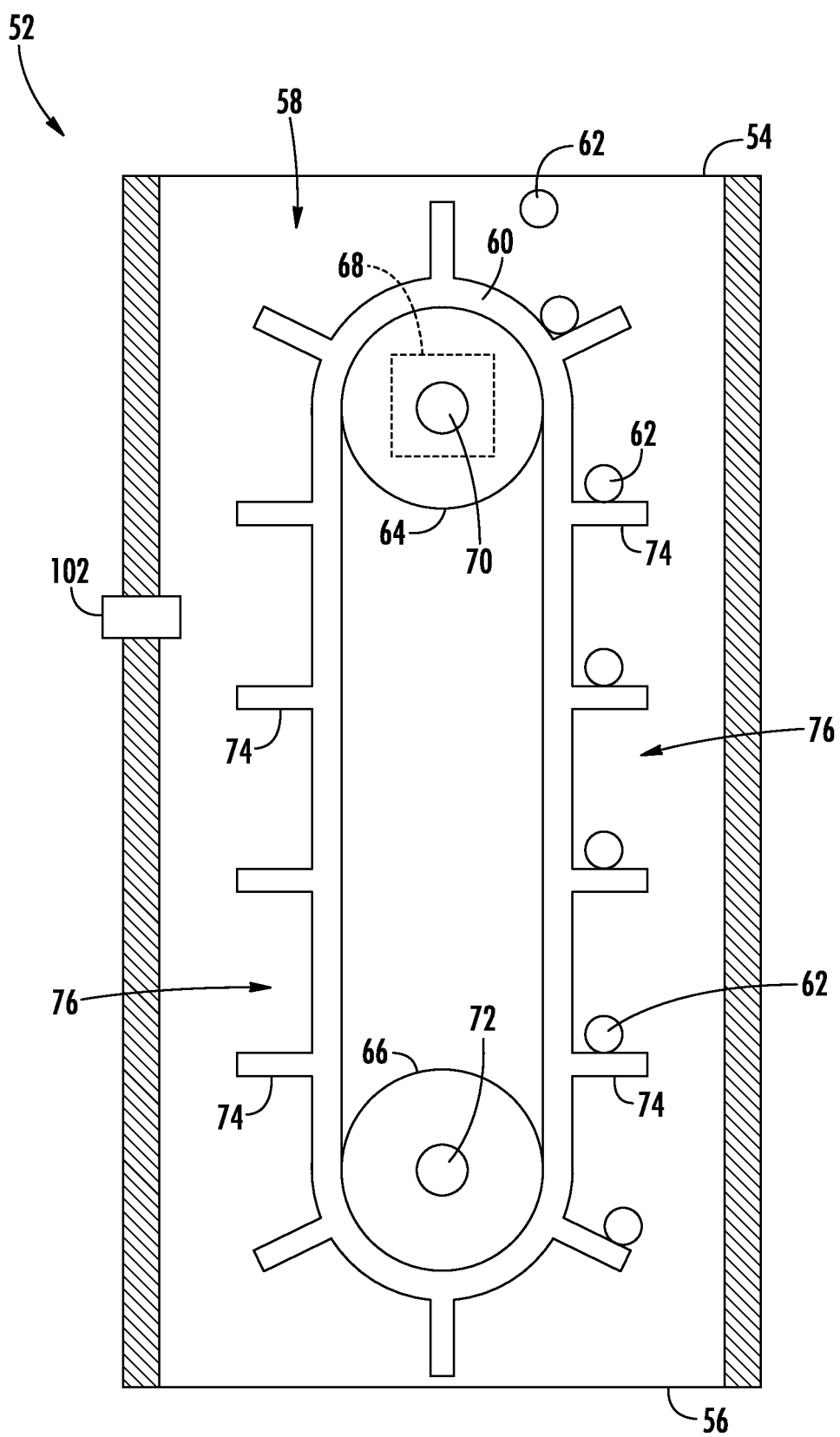
FIG. 3 illustrates a cross-sectional side view of one embodiment of a seed tube in accordance with aspects of the present subject matter, particularly illustrating a rotationally-driven belt positioned within a passage defined by the seed tube.

Referring now to FIG. 3, a schematic, cross-sectional view of one embodiment of the seed tube 52 shown in FIG. 2 is illustrated in accordance with aspects of the present subject matter. In general, the seed tube 52 may extend between an upper end 54, which is configured to be coupled to or otherwise positioned adjacent to a seed outlet (not shown) of the seed meter 50, and a lower end 56, which is configured to be positioned proximate to the furrow. Furthermore, the seed tube 52 may define a passage 58 extending between the upper and lower ends 54, 56 through which the seeds 62 travel once dispensed from the seed meter 50.

In accordance with aspects of the present subject matter, a rotationally-driven belt 60 configured to convey seeds 62 from the seed meter 50 to the furrow may be positioned within the passage 58 of the seed tube 52. Specifically, in several embodiments, the belt 60 may be rotatably supported relative to the seed tube 52 by an upper pulley 64 positioned proximate to the upper end 54 of the seed tube 52 and a lower pulley 66 positioned proximate to the lower end 56 of the seed tube 52. For example, in the illustrated embodiment, an actuator 68, such as an electric motor, may be configured to rotationally drive the upper pulley 64 relative to the seed tube 52 via an upper shaft 70. In such embodiments, the lower pulley 66 may rotate relative to the seed tube 52 about a lower shaft 72, but not be driven. However, it should be appreciated that, in alternative embodiments, the actuator 68 may be configured to rotationally drive the lower pulley 66 relative to the seed tube 52 via the lower shaft 72, while the upper pulley 64 may not be driven.

Figure 4:
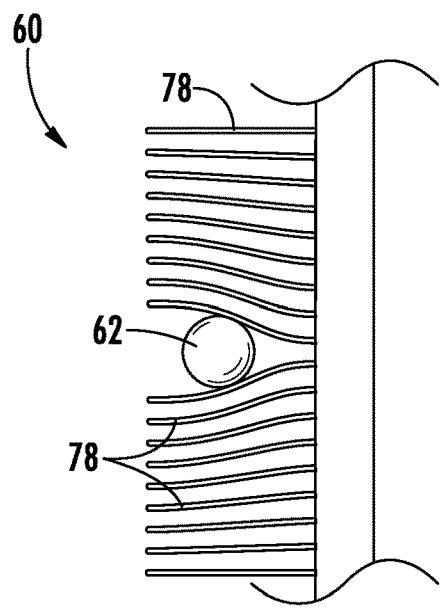
FIG. 4 illustrates a partial side view of one embodiment of a rotationally-driven belt suitable for positioning within a seed tube in accordance with aspects of the present subject matter, particularly illustrating a plurality of bristles coupled to the belt and configured for receiving seeds from a seed meter.

In the embodiment shown in FIG. 3, the belt 60 may include a plurality of outwardly-extending fingers 74. Specifically, the fingers 74 may be evenly spaced apart along the belt 60 so as to define a pocket 76 positioned between each adjacent pair of the fingers 74. As such, each pocket 76 may be configured to receive one of seeds 62 dispensed from the seed meter 50. In this regard, as the actuator 68 drives the belt 60, the belt 60 may carry the seeds 62 positioned in the pockets 76 from the top end 54 of the seed tube 52 to the bottom end 56 of the seed tube 52. Once at the bottom end 56 of the seed tube 52, the seeds 62 may be gravitationally deposited within the furrow. However, in alternative embodiments, the belt 60 may not include the plurality of fingers 74. For example, as illustrated in the alternative embodiment of FIG. 4, a plurality of bristles 78 may extend outward from the belt 60 in place of the fingers 74. As such, the bristles 60 may be configured to receive and hold the seeds 62 dispensed from the seed meter 50 as the belt 60 conveys the seeds 62 between the top and bottom ends 54, 56 of the seed tube 52.

Figure 5:
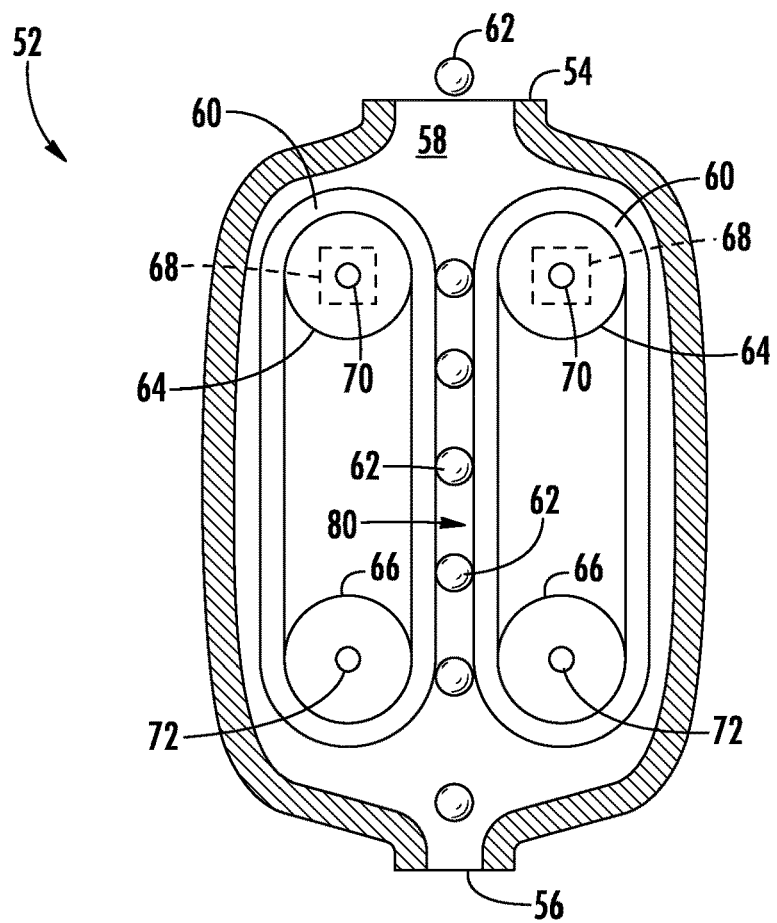
FIG. 5 illustrates a partial side view of a further embodiment of a seed tube in accordance with aspects of the present subject matter, particularly illustrating a pair of rotationally-driven belts positioned within a passage defined by the seed tube.

FIG. 5 illustrates a schematic, cross-sectional view of a further embodiment of the seed tube 52 in accordance with aspects of the present subject matter. As shown, a pair of rotationally-driven belts 60 configured to convey seeds 62 from the seed meter 50 to the furrow may be positioned within the passage 58 of the seed tube 52. Unlike the embodiments of the belt 60 shown with respect to FIGS. 3 and 4, the belts 60 shown in FIG. 5 may not include the fingers 74, the bristles 78, and/or any other projections configured to receive the seeds 62 dispensed from the seed meter 50. Instead, the pair of belts 60, which are rotationally driven in opposite directions (e.g., one belt 60 rotates clockwise, while the other belt 60 rotates counterclockwise), rely on friction to convey the seeds 62 through the seed tube 52. Specifically, the belts 60 define a gap 80 therebetween that is sized such that the belts 60 frictionally engage the seeds 62 when the seeds 62 enter the gap 80. As such, the rotation of the belts 60 conveys the seeds 62 from the first end 54 of the seed tube 52 to the second end 56 of the seed tube 52 while maintaining the desired spacing between the seeds 60.

It should be appreciated that the configurations of the seed tube 52 and the belt(s) 60 described above and shown in FIGS. 3-5 are provided only to place the present subject matter in an exemplary field of use. Thus, it should be appreciated that the present subject matter may be readily adaptable to any manner of seed tube and/or belt configuration.

Figure 6:
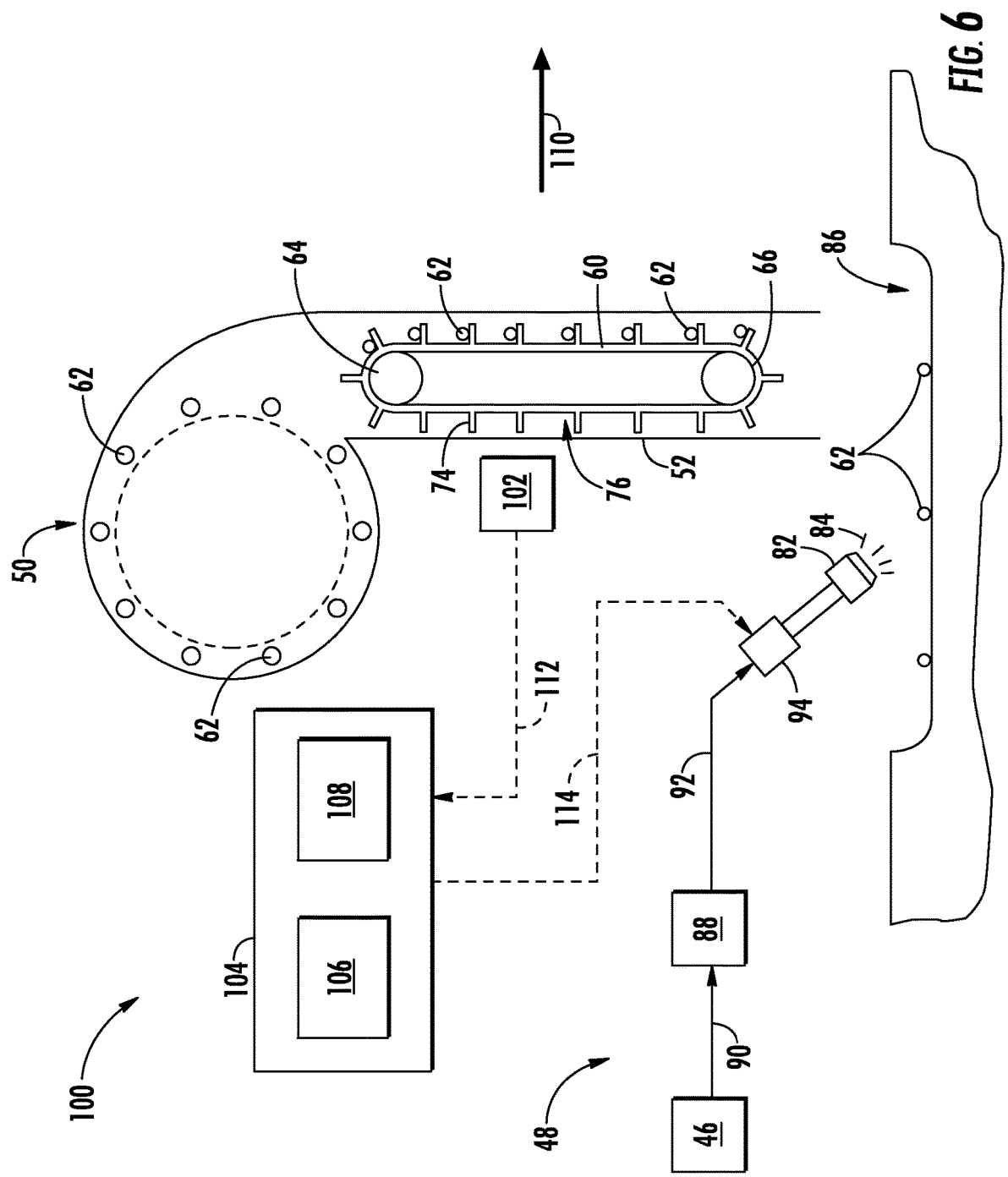
FIG. 6 illustrates a schematic view of one embodiment of a system for spraying a fluid onto or near seeds dispensed from a seed meter of a planter in accordance with aspects of the present subject matter, particularly illustrating the system including a spray assembly configured to spray the fluid onto the seeds after the seeds have been dispensed into the furrow.
Figure 7:
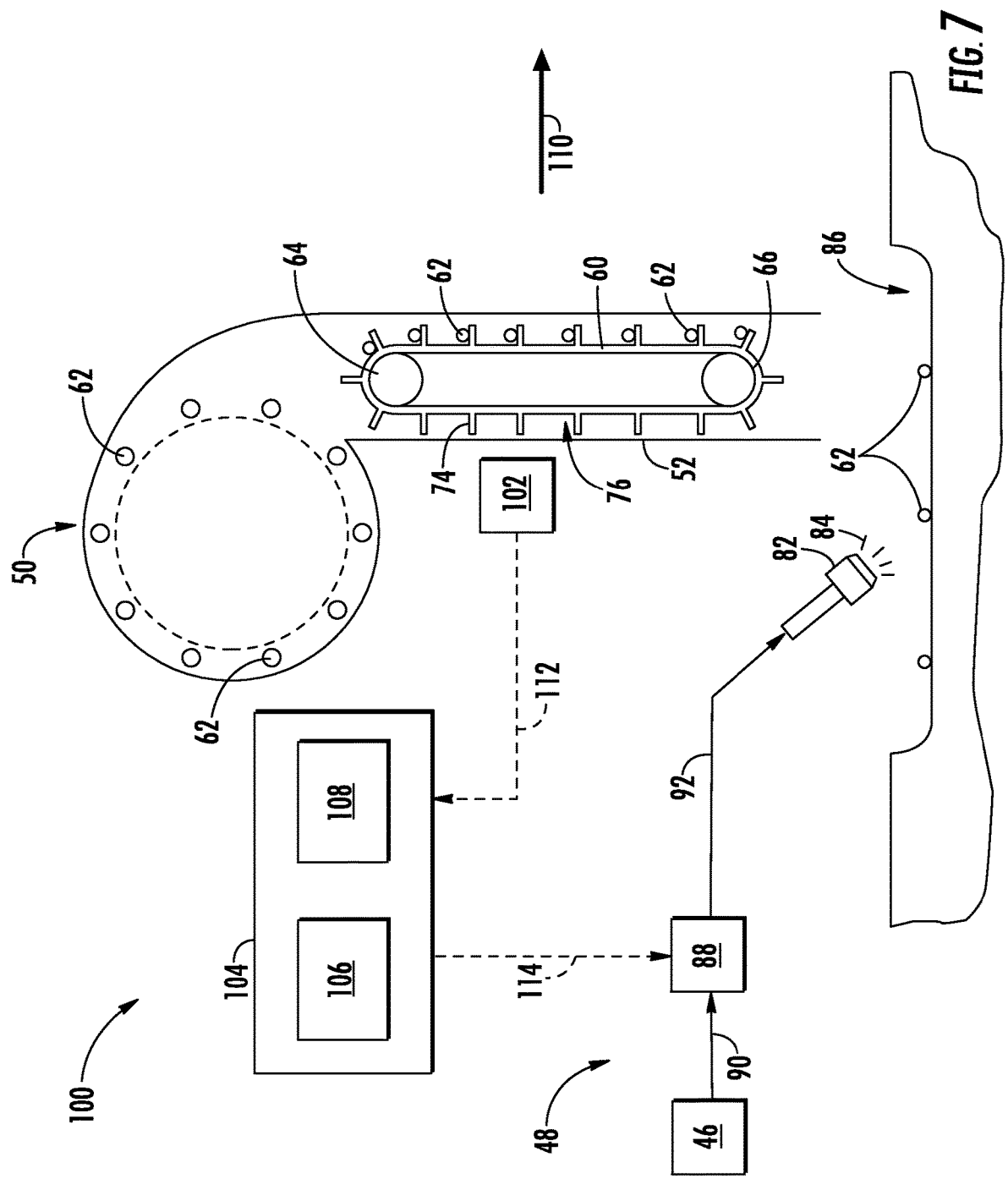
FIG. 7 illustrates a schematic view of another embodiment of a system for spraying a fluid onto or near seeds dispensed from a seed meter of a planter in accordance with aspects of the present subject matter.
Figure 8:
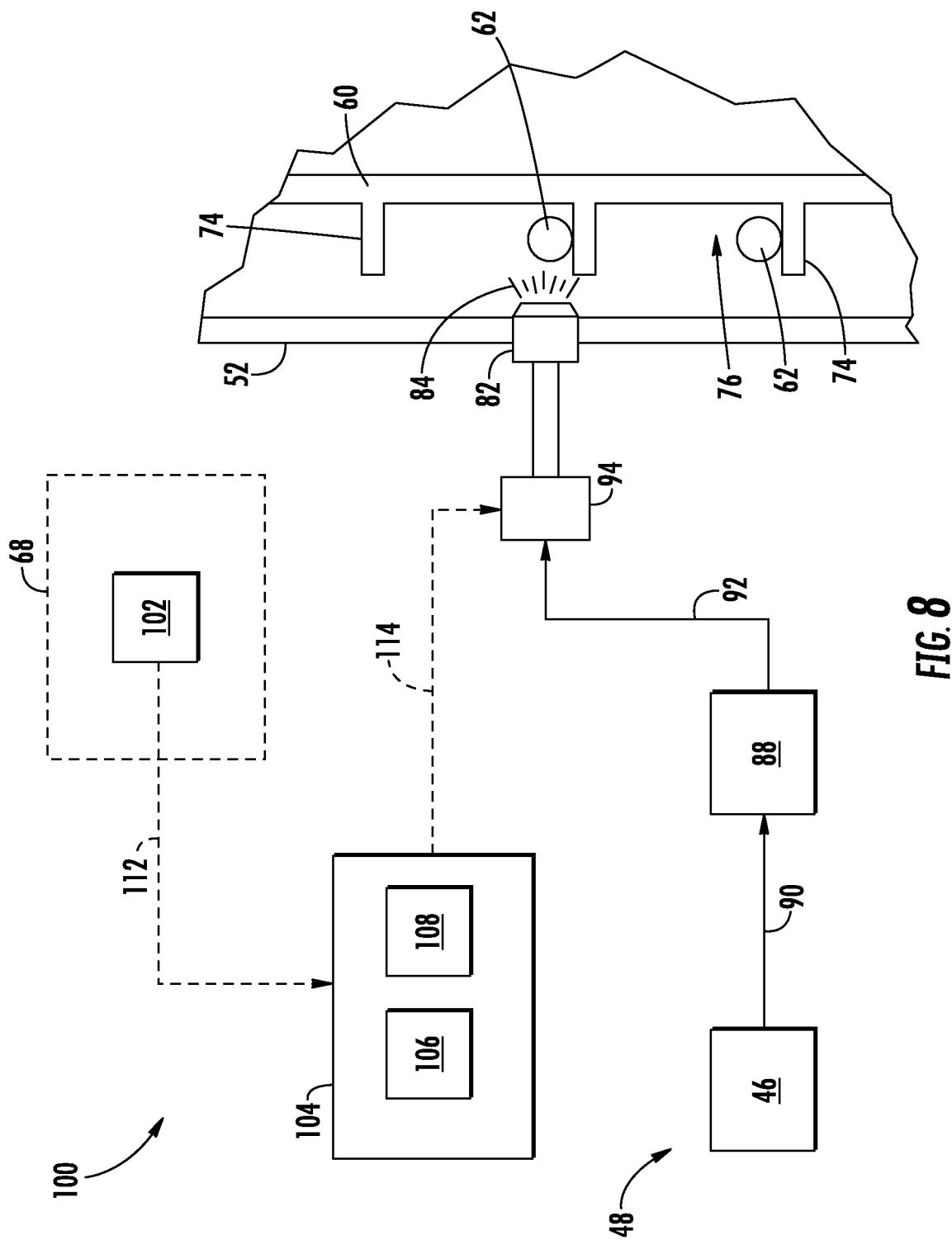
FIG. 8 illustrates a schematic view of a further embodiment of a system for spraying a fluid onto or near seeds dispensed from a seed meter of a planter in accordance with aspects of the present subject matter, particularly illustrating the system including a spray assembly configured to spray the fluid onto the seeds before the seeds have been dispensed into the furrow.

Referring now to FIGS. 6-8, schematic views of various embodiments of a system 100 for spraying a fluid onto or near seeds dispensed from a seed meter of a planter are illustrated in accordance with aspects of the present subject matter. In general, the system 100 will be described herein with reference to the planter 10, the row unit 18, and the seed tube 52 described above with reference to FIGS. 1-5. However, it should be appreciated by those of ordinary skill in the art that the disclosed system 100 may generally be utilized with seed tubes having any other suitable seed tube configuration, row units having any other suitable row unit configuration, and/or planters having any other suitable planter configuration.

As shown in FIGS. 6-8, the system 100 may include a sprayer assembly 48, which may include a nozzle 82 configured to spray a fluid 84 onto the seeds 62 dispensed from the seed meter 50. For example, in the embodiments shown in FIGS. 6 and 7, the nozzle 82 may be configured to spray the fluid 84 onto the seeds 62 after the seeds 62 have been deposited into the furrow 86 formed in the ground (e.g., by the opening disk 38). In such embodiments, the nozzle 82 may be mounted to the row unit 18 such that the nozzle 82 is positioned to spray the fluid 84 between the opening disk 38 and the closing disk 40. However, in the embodiment shown in FIG. 8, the nozzle 82 may be configured to spray the fluid 84 onto the seeds 62 when the seeds 62 are positioned within the seed tube 52. In such embodiment, the nozzle 82 may be coupled to and/or extend through the seed tube 52, such as at a position generally located centrally between the top and bottom ends 54, 56 of the seed tube 52. As such, the nozzle 82 may be configured to spray the fluid 84 onto the seeds 62 as the seeds 62 are being conveyed through the seed tube 52 by the belt 60 and pass by the nozzle 82.

The sprayer assembly 48 may also include any suitable combination of related fluid-delivery components configured to provide the fluid 84 to the nozzle 82. As shown in FIGS. 6-8, in several embodiments, the sprayer assembly 48 may include a pump 88 configured to provide the fluid 84 from the fluid tank 46 to the nozzle 82 (e.g., via fluid conduits 90, 92) at a sufficient pressure such that the fluid 84 may be sprayed or otherwise ejected from the nozzle 82 in a manner that covers or coats the seeds 62 with the fluid 84. Since the seeds 62 are deposited into the furrow 86 in a spaced apart manner, a valve 94 (e.g., a solenoid valve) may be configured to selectively occlude the flow of the fluid 84 provided to the nozzle 82 by the pump 88 such that the nozzle 82 sprays pulses of the fluid 84. As will be described below, the pulses of the 84 may be timed such that the nozzle 82 sprays the fluid 84 onto or near the seeds 62. In this regard, the valve 94 may prevent the fluid 84 from exiting the nozzle 82 when the valve 94 is in a closed position, while the valve 90 may permit the fluid 84 to exit the nozzle 82 when the valve 94 is in an open position. In alternative embodiments, as shown in FIG. 7, the pump 88 may be configured to provide pulses of the fluid 84 to the nozzle 82 such that a valve is unnecessary. In such embodiment, the pump 88 may correspond to a peristaltic pump. However, it should be appreciated that the pump 88 may correspond to any suitable type and/or configuration of pump.

Referring still to FIGS. 6-8, the system 100 may also include a speed sensor 102 configured to detect an operating parameter indicative of a current speed of the belt 60 relative to the seed tube 52. In general, the speed sensor 102 may correspond to any suitable sensor(s) or sensing device(s) configured to directly or indirectly detect the motion of the belt 60. For example, as shown in FIGS. 6 and 7, the speed sensor 102 may be provided in operative association with the belt 60. In such embodiments, the speed sensor 102 may correspond to a Hall Effect sensor coupled to and/or extending through the seed tube 52 as shown in FIG. 3. In this regard, the speed sensor 102 may be configured to detect when one of the fingers 74 coupled to the belt 60 passes by the speed sensor 102, which may be indicative of the speed of the belt 60. In alternative embodiments, as shown in FIG. 8, the speed sensor 102 may be provided in operative association with the actuator 68. As such, the speed sensor 102 may be configured to detect a current speed of an output shaft (e.g., the upper shaft 74) of the actuator 68, which may be indicative of the current speed of the belt 60. However, it should be appreciated that the speed sensor 102 may correspond to any other suitable sensor(s) or sensing device(s) configured to detect the motion of the belt 60.

In accordance with aspects of the present disclosure, the system 100 may further include a controller 104 configured to electronically control the operation of one or more components of the planter 10 or the work vehicle (not shown). In general, the controller 104 may comprise any suitable processor-based device known in the art, such as a computing device or any suitable combination of computing devices. Thus, in several embodiments, the controller 104 may include one or more processor(s) 106 and associated memory device(s) 108 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 108 of the controller 104 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 108 may generally be configured to store suitable computer-readable instructions that, when implemented by the processor(s) 106, configure the controller 104 to perform various computer-implemented functions, such as one or more aspects of the method 200 described below with reference to FIG. 9. In addition, the controller 104 may also include various other suitable components, such as a communications circuit or module, one or more input/output channels, a data/control bus and/or the like.

It should be appreciated that the controller 104 may correspond to an existing controller of the planter 10 or the work vehicle or the controller 104 may correspond to a separate processing device. For instance, in one embodiment, the controller 104 may form all or part of a separate plug-in module that may be installed within the planter 10 or the work vehicle to allow for the disclosed system and method to be implemented without requiring additional software to be uploaded onto existing control devices of the planter 10 or the work vehicle.

In several embodiments, the controller 104 may be configured to operate the planter 10 such that the planter 10 deposits the seeds 62 within the furrow 86 with the desired spacing. Specifically, in several embodiments, as the planter 10 moves in a direction of travel (e.g., as indicated by arrow 110 in FIGS. 6 and 7), the controller 104 may be configured to control the seed meter 50 (e.g., by controlling a suitable actuator of seed meter 50) such that the seed meter 50 dispenses one of the seeds 62 into the seed tube at a frequency that achieves the desired seed spacing within the furrow 86. Furthermore, the controller 104 may be configured to control the belt 60 (e.g., by controlling the actuator 68) such that the belt 60 conveys the seeds 62 from the seed meter 50 through the seed tube 52 at a speed that maintains the desired seed spacing within the furrow 86. Once the seeds 86 reach the bottom end 56 of the seed tube 52, the seeds 62 may be gravitationally deposited into the furrow 86.

During operation of the planter 10, the controller 104 may be configured to determine to a current speed of the belt 60 relative to the seed tube 52. Specifically, the controller 104 may be communicatively coupled to the speed sensor 102 via a wired or wireless connection to allow measurement signals (e.g., indicated by dashed line 112 in FIGS. 6-8) to be transmitted from the speed sensor 102 to the controller 104. The controller 104 may then be configured determine or estimate the current speed of the belt 60 relative to the seed tube 52 based on the measurement signals 112 received from the speed sensor 102. For instance, the controller 104 may include a look-up table or suitable mathematical formula stored within its memory 108 that correlates the sensor measurements to the current speed of the belt 60.

Furthermore, in one embodiment, the controller 104 may be configured to determine a target pulse frequency based on the current speed of the belt 60. In general, the target pulse frequency may correspond to the frequency at which the sprayer assembly 48 may spray pulses or volumes of the fluid 84 to coat each of the seeds 62 or the area immediately surrounding the seeds 62 without wasting a portion of the fluid 84 by significantly spraying the area between the seeds 62. As described above, the seeds 62 may be conveyed through the seed tube 52 by the belt 60 so as to be dispensed into the furrow 86 in a spaced apart manner. In this regard, the current speed of the belt 60 may be indicative of the target pulse frequency. For instance, the controller 104 may include a look-up table or suitable mathematical formula stored within its memory 108 that correlates the determined current speed of the belt 60 to the target pulse frequency.

In accordance with aspects of the present disclosure, the controller 104 may also be configured to control the sprayer assembly 48 based on the determined or monitored speed of the belt 60 such that the sprayer assembly 48 sprays the fluid 84 onto and/or near the seeds 86. Specifically, the controller 104 may be communicatively coupled to various components of the sprayer assembly 48, such as the pump 88 and/or the valve 94, via a wired or wireless connection to allow control signals (e.g., indicated by dashed line 114 in FIGS. 6-8) to be transmitted from the controller 104 to the sprayer assembly 48. For example, in the embodiments shown in FIGS. 6 and 8, the controller 104 may be configured to transmit the control signals 112 to the valve 94 instructing the valve 94 to open, thereby permitting a volume of the fluid 84 to be sprayed by the nozzle 84 onto the seeds 62. However, in an alternative embodiment, as shown in FIG. 7, the controller 104 may be configured to transmit the control signals 112 to the pump 88 (e.g., a peristaltic pump) instructing the pump 88 to provide a volume of the fluid 84 to the nozzle 82 for spraying onto and/or near the seeds 62. In general, the controller 104 may be configured to transmit the control signals 112 at a frequency, e.g., the target pulse frequency, such that the sprayer assembly 48 sprays a volume of the fluid 84 onto and/or near the seeds 86 without significantly spraying the area between the seeds 62. However, it should be appreciated that the controller 104 may be configured to control the sprayer assembly 48 in any suitable manner.

During operation of the planter 10, the current speed of the belt 60 may change, such as when the current speed of the planter 10 changes or when the desired spacing of the seeds 62 changes. In such instances, the controller 104 may be configured to update the target pulse frequency when the current speed of the belt 60 changes, thereby ensuring that the seeds 62 and/or the nearby area are coated with the fluid 84 even when the frequency at which the seeds 62 are dispensed changes.

In several embodiments, the controller 104 may be configured to control the sprayer assembly 48 based on other parameters in addition to the current speed of the belt 60. For example, in several embodiments, the controller 104 may be configured to control the sprayer assembly 48 based on a current speed of the planter 10. In such embodiments, the controller 104 may be configured to determine a duration or volume of the pulse of the fluid 84 sprayed by the nozzle 82 onto the seeds 86 based on the current speed of the planter 10. However, it should be appreciated that the controller 104 may be configured to control the sprayer assembly 48 based on any suitable parameter or criteria in addition to the current speed of the belt 60.

Figure 9:
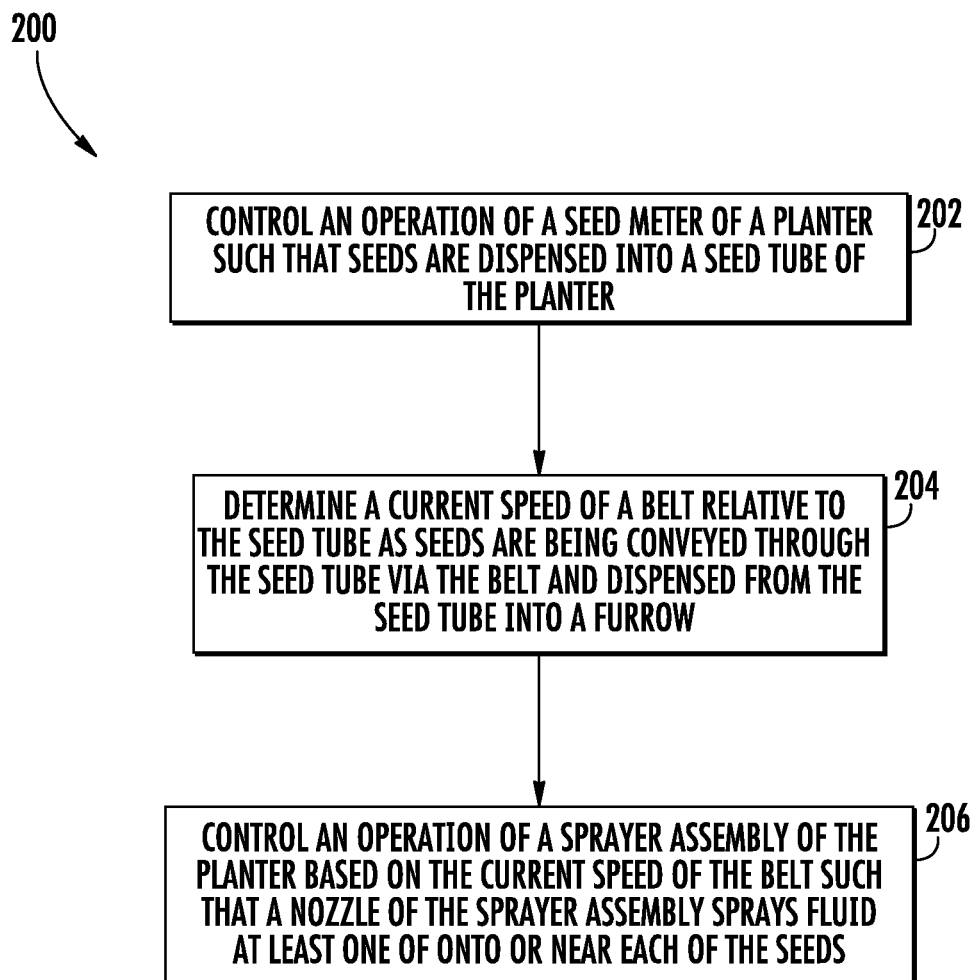
FIG. 9 is a flow diagram of one embodiment of a method for spraying a fluid onto or near seeds dispensed from a seed meter of a planter in accordance with aspects of the present subject matter.

Referring now to FIG. 9, a flow diagram of one embodiment of a method 200 for spraying a fluid onto or near seeds dispensed from a seed meter of a planter is illustrated in accordance with aspects of the present subject matter. In general, the method 200 will be described herein with reference to the planter 10 and the system 100 described above with reference to FIGS. 1-8. However, it should be appreciated by those of ordinary skill in the art that the disclosed method 200 may generally be utilized to spray a fluid onto or near seeds dispensed from any planter having any suitable planter configuration, any row unit having any suitable row unit configuration, and/or any seed tube having any suitable seed tube configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (202), the method 200 may include controlling an operation of a seed meter of a planter such that seeds are dispensed into a seed tube of the planter. For instance, the controller 104 may be configured to control an actuator (not shown) of the seed meter 48 such that the seed meter 48 dispenses the seeds 62 into the seed tube at a frequency such that the desired spacing between seeds 86 within the furrow 86 is achieved. In this regard, the belt 60 may then convey the seeds 62 from the seed meter 50 through the seed tube 52 to the furrow 86.

Furthermore, at (204), the method 200 may include determining a current speed of a belt relative to a seed tube as seeds are being conveyed through the seed tube via the belt and dispensed from the seed tube into a furrow. For instance, as indicated above, the controller 104 may be communicatively coupled to the speed sensor 102, which may be configured to detect an operating parameter indicative of a current speed of the belt 60 relative to the seed tube 52. As such, measurement signals or sensor data 112 transmitted from the speed sensor 102 may be received by the controller 104 for determining the current speed of the belt 60.

Additionally, as shown in FIG. 9, at (206), the method 200 may include controlling an operation of a sprayer assembly of a planter based on the current speed of the belt such that a nozzle of the sprayer assembly sprays fluid onto or near each of the seeds. For instance, as indicated above, the controller 104 may be communicatively coupled to various components of the sprayer assembly 48, thereby permitting the controller 104 to transmit control signals 114 to the sprayer assembly 48 instructing the sprayer assembly 48 to spray a volume of the fluid 84. As such, the controller 104 may be configured to transmit such control signals 114 at a frequency, which may be based on the determined speed of the belt 60, such that the sprayer assembly 48 sprays the fluid 84 onto and/or near the seeds 86 without spraying significantly the area between the seeds 62.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for spraying fluids onto or near seeds dispensed from a planter, the system comprising:
   a seed meter configured to dispense seeds from a hopper;
   a seed tube extending from the seed meter toward a furrow;

a rotationally-driven belt positioned within the seed tube, the belt configured to convey the seeds from the seed meter through the seed tube to the furrow;

a nozzle configured to spray a fluid on or near the seeds dispensed from the seed meter;

a pump configured to supply the fluid to the nozzle; and a controller communicatively coupled to the pump, wherein the controller determines a current speed of the belt relative to the seed tube and controls the pump based on the current speed of the belt such that the nozzle sprays the fluid at least one of onto or near each of the seeds.

2. The system of claim 1, wherein the controller is configured to determine a target pulse frequency based on the current speed of the belt and control the pump such that the nozzle dispenses fluid through the nozzle at the target pulse frequency.

3. The system of claim 2, wherein the controller is further configured to update the target pulse frequency based on changes in the current speed of the belt.

4. The system of claim 2, wherein, when controlling the pump, the controller is configured to control the pump such that the pump provides a volume of the fluid to the nozzle at the target pulse frequency for spraying at least one of onto or near each of the seeds.

5. The system of claim 1, wherein the controller is configured to control the pump based on a current speed of the planter and the current speed of the belt such that the nozzle sprays the fluid at least one of onto or near each of the seeds.

6. The system of claim 1, wherein the nozzle is configured to spray the fluid onto or near the seeds after the seeds have been dispensed into the furrow.

7. The system of claim 1, wherein the nozzle is configured to spray the fluid onto the seeds while the seeds are being conveyed through the seed tube.

8. The system of claim 1, further comprising:
a sensor configured to detect a parameter indicative of the current speed of the belt relative to the seed tube, wherein the controller determines the current speed of the belt based on measurement signals received from the sensor.

9. The system of claim 1, further comprising:
an actuator configured for rotationally driving the belt; and
a sensor configured to detect a parameter indicative of the current speed of the actuator, wherein the controller determines the current speed of the belt based on measurement signals received from the sensor.

10. The system of claim 1, wherein the belt comprises a plurality of spaced apart fingers, each adjacent pair of the plurality of fingers defining a pocket configured to receive one of the seeds dispensed from the seed meter.

11. The system of claim 1, wherein the belt comprises a plurality of bristles configured to receive the seeds dispensed from the seed meter.

12. The system of claim 1, wherein the belt comprises a pair of belts configured to be rotationally driven in opposite directions.

13. A method for spraying fluids onto or near seeds dispensed from a planter, the method comprising:
controlling, with a computing device, an operation of a seed meter of the planter such that seeds are dispensed into a seed tube of the planter from a hopper, the seed tube including a rotationally-driven belt positioned therein;
determining, with the computing device, a current speed of the belt relative to the seed tube as seeds are being conveyed through the seed tube via the belt and dispensed from the seed tube into a furrow; and
controlling, with the computing device, an operation of a pump of the planter based on the current speed of the belt such that a nozzle sprays fluid at least one of onto or near each of the seeds, the pump configured to supply the fluid to the nozzle.

14. The method of claim 13, further comprising:
determining, with the computing device, a target pulse frequency based on the current speed of the belt; and
controlling, with the computing device, the operation of the pump such that the nozzle dispenses fluid at the target pulse frequency.

15. The method of claim 14, wherein controlling the operation of the pump comprises controlling, with the computing device, the operation of the pump such that the pump provides a volume of the fluid to the nozzle at the target pulse frequency for spraying at least one of onto or near each of the seeds.

16. The method of claim 13, further comprising:
updating, with the computing device, the target pulse frequency based on changes in the current speed of the belt.

17. The method of claim 13, further comprising:
controlling, with the computing device, the pump based on the current speed of the planter such that the nozzle sprays the fluid at least one of onto or near each of the seeds.

18. The method of claim 13, further comprising:
determining, with the computing device, the current speed of the belt based on measurement signals received from a sensor being configured to detect a parameter indicative of the current speed of the belt relative to the seed tube.

19. The method of claim 13, further comprising: determining, with the computing device, the current speed of the belt based on measurement signals received from a sensor being configured to detect a parameter indicative of the current speed of the of an actuator configured to rotationally drive the belt.

* * * * *